(12) United States Patent
Song et al.

(10) Patent No.: US 7,482,930 B2
(45) Date of Patent: Jan. 27, 2009

(54) LIMITER FOR CONTROLLING OVERVOLTAGE AND RFID TAG HAVING THE SAME

(75) Inventors: Il-jong Song, Suwon-si (KR); Young-hoon Min, Anyang-si (KR); Chol-su Yoon, Yongin-si (KR); Dong-sik Shim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 207 days.

(21) Appl. No.: 11/486,279

(22) Filed: Jul. 14, 2006

(65) Prior Publication Data

US 2007/0152827 A1 Jul. 5, 2007

(30) Foreign Application Priority Data

Dec. 27, 2005 (KR) ...................... 10-2005-0130759

(51) Int. Cl.
*G08B 13/14* (2006.01)
(52) U.S. Cl. .................. 340/572.1; 340/693.1; 340/662; 340/635; 340/636.17; 363/126
(58) Field of Classification Search ................ 340/645, 340/662, 572.1, 636.12, 539.1, 635, 636.15, 340/636.17, 693.1, 10.34; 363/125, 126; 361/104, 103, 118
See application file for complete search history.

(56) References Cited

U.S. PATENT DOCUMENTS

| 4,575,821 | A | * | 3/1986 | Eden et al. | .................... 365/154 |
| 5,181,026 | A | * | 1/1993 | Granville | ............... 340/870.28 |
| 5,621,630 | A | * | 4/1997 | Suzuki et al. | .................. 363/71 |
| 6,816,352 | B2 | * | 11/2004 | Hoopes | ...................... 361/104 |
| 6,894,465 | B2 | * | 5/2005 | Sutardja et al. | ............. 323/268 |

* cited by examiner

*Primary Examiner*—Anh V La
(74) *Attorney, Agent, or Firm*—Sughrue Mion, PLLC

(57) ABSTRACT

A limiter for controlling an overvoltage and an RFID tag having the same are provided. The limiter includes a first limiter part and a second limiter part serially connected to the first limiter part. The second limiter part has at least one limit diode whose threshold voltage is lower than that of elements in the first limiter part. Accordingly, if an overvoltage is input, the limiter can maximize the input current drop so that the limiter can maximize the leakage voltage. As a result, the RFID tag can prevent the RFID driving part from being damaged due to the overvoltage. In addition, the RFID tag can normally operate regardless of the intensity of the driving voltage input from the RFID reader, so that the yields of products can improve.

15 Claims, 4 Drawing Sheets

LIMITER FOR CONTROLLING OVERVOLTAGE AND RFID TAG HAVING THE SAME

CROSS-REFERENCE TO RELATED APPLICATIONS

This application claims priority from Korean Patent Application No. 10-2005-0130759, filed Dec. 27, 2005 in the Korean Intellectual Property Office, the entire contents of which are incorporated herein by reference.

BACKGROUND OF THE INVENTION

1. Field of the Invention

The present invention relates to a limiter for controlling an overvoltage and a radio frequency identification (RFID) tag having the same. More particularly, the present invention relates to a limiter for controlling an overvoltage to protect driving elements of the RFID tag by limiting an overvoltage received from an RFID reader.

2. Description of the Related Art

An RFID system is an automatic identification and data capture (ADC) technology using a radio frequency. The RFID system consists of an RFID reader and an RFID tag communicating with each other.

Specifically, the RFID reader transmits an electromagnetic wave of a certain frequency band and the RFID tag stores authentication information for identifying RFID tags and certain data. If the RFID tag is located within a magnetic field or electrical field of the RFID reader, the RFID tag transmits the authentication information and data to the RFID reader. The RFID reader authenticates the RFID tag using the authentication information.

The RFID tag receives power driving the RFID tag through an electromagnetic wave from the RFID reader. The intensity of the power from the RFID reader to the RFID tag corresponds to the distance between the RFID reader and the RFID tag. That is, the shorter the distance between the RFID reader and the RFID tag is, the more intense the input power from the RFID reader is, so that an overvoltage is supplied to the RFID tag.

If the overvoltage is supplied to the RFID tag, the driving elements in the RFID tag can malfunction or be damaged.

To prevent this, the RFID tag has a limiter to control the voltage input to the driving elements. If the input voltage is lower than a reference voltage to drive the driving elements, the limiter allows the maximum current to flow into the driving elements. If the input voltage is greater than the reference voltage, the limiter allows the minimum current to flow into the driving elements.

The limiter has plural metal oxide semiconductor field effect transistors (MOSFETs), and the MOSFETs are connected to one another in series. If the input voltage is over the reference voltage, the MOSFETs are sequentially turned on, and if the input voltage is below the reference voltage, the MOSFETs are turned off. In other words, if the input voltage is below the reference voltage, the limiter minimizes a leakage current to increase the input current provided to the driving elements. And, if the input voltage is over the reference voltage, the limiter increases the leakage current to reduce the input current. Accordingly, the RFID system can normally operate regardless of the intensity of the input voltage.

However, in general, the threshold voltage of the MOSFET is about 0.8 V, so the limiter can not control a voltage below the threshold voltage. Therefore, when controlling the overvoltage, the limiter has a limit to maximize the leakage current.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a limiter for controlling an overvoltage to maximize leakage current according to the overvoltage.

The present invention also provides an RFID tag having the limiter.

According to an aspect of the present invention, there is provided a limiter for controlling an overvoltage, comprising a first limiter part and a second limiter part.

The first limiter part comprises a first switching part which includes plural first elements connected to one another in series and sequentially being turned on according to the intensity of an input voltage from the outside, and at least one second switching part connected to the first switching part in parallel. The second limiter part is connected to the first switching part and includes at least one limit diode with a threshold voltage lower than that of the first elements.

The limit diode may be a Schottky barrier diode.

Further, the limit diode may be serially connected to the first switching part in the forward direction.

Meanwhile, the second limiter part may include multiple limit diodes, and the limit diodes are connected to one another in series.

The first elements can be metal oxide semiconductor field effect transistors (MOSFET)

The second switching part may be formed with a pair of second elements which have different current features and connected to each other in series.

A pair of the second elements may be a MOSFET and a bipolar junction transistor (BJT).

According to an aspect of the present invention described above, there is also provided an RFID tag, comprising an antenna part, an RFID driving part and a limiter.

The antenna part receives and outputs an input voltage. The RFID driving part is connected to the antenna part in parallel in the forward direction, receives the input voltage, generates an authentication information in response to the input voltage, and provides the authentication information to the antenna part. The limiter is connected to the antenna part in parallel in the forward direction, and is turned on according to the intensity of the input voltage.

The limiter comprises a first limiter part comprising a first switching part which includes plural first elements connected to one another in series and sequentially being turned on according to the intensity of an input voltage from the antenna part, and at least one second switching part connected to the first switching part in parallel; and a second limiter part connected to the first switching part and including at least one limit diode with a threshold voltage lower than that of the first elements.

A driving voltage of the limiter is greater than that of the RFID driving part, and if the input voltage from the antenna part is greater than the driving voltage of the RFID driving part, the limiter becomes turned on.

The limit diode may be a Schottky barrier diode.

The limit diode may be serially connected to the first switching part in the forward direction.

Meanwhile, the second limiter part may include the plural limit diodes, and the limit diodes are connected to one another in series.

As can be appreciated from the above description, the limiter of the RFID tag includes the first limiter part and the second limiter part including at least one limit diode with the threshold voltage lower than that of the elements in the first limiter part. Accordingly, if the overvoltage is supplied, the limiter can maximize the leakage current, and if a low voltage lower than the reference voltage is supplied, the limiter can minimize the leakage current. As a result, the RFID tag can prevent the RFID driving part from being damaged due to the overvoltage. In addition, the RFID tag can normally operate regardless of the intensity of the driving voltage input from the RFID reader, so that the yields of products can improve.

BRIEF DESCRIPTION OF THE DRAWING FIGURES

The above and other aspects of the present invention will become more apparent by describing in detail exemplary embodiments thereof with reference to the attached drawing figures, wherein.

DETAILED DESCRIPTION OF THE EXEMPLARY EMBODIMENTS

Figure 1:
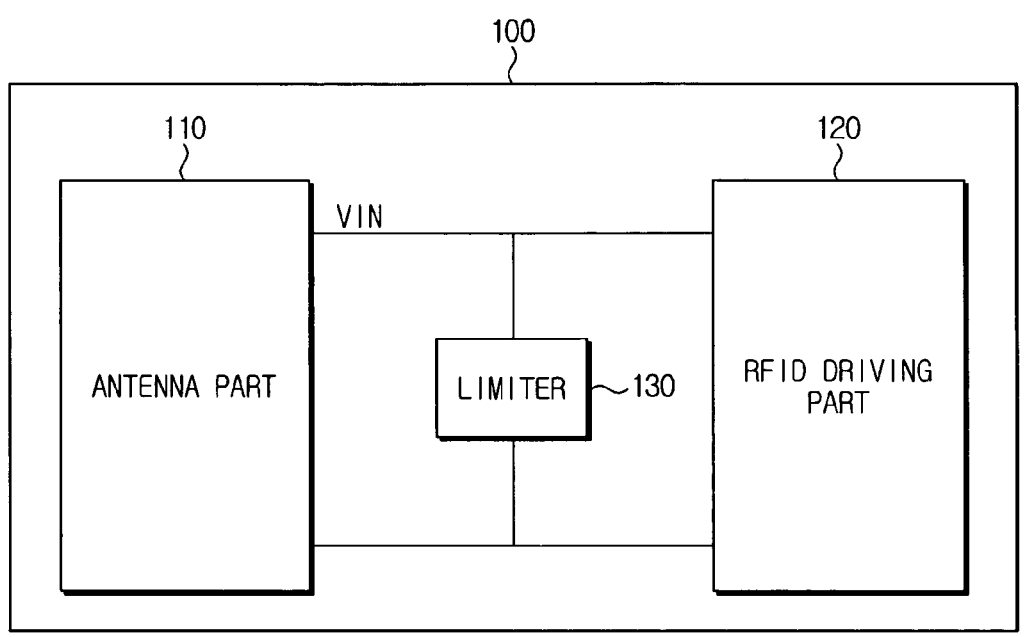
FIG. 1 is a block diagram showing the configuration of an RFID tag according to an exemplary embodiment of the present invention.

Hereinafter, exemplary embodiments of the present invention will be described in detail with reference to the accompanying drawing figures.

In the following description, same drawing reference numerals are used for the same elements even in different drawings. The matters defined herein are described at a high-level of abstraction to provide a comprehensive yet clear understanding of the invention. It is also to be noted that it will be apparent to those ordinarily skilled in the art that the present invention is not limited to the description of the exemplary embodiments provided herein.

FIG. 1 is a block diagram showing the configuration of an RFID tag according to an exemplary embodiment of the present invention.

Referring to FIG. 1, the RFID tag 100 includes an antenna part 110, an RFID driving part 120 and a limiter 130.

To be specific, the antenna part 110 transmits and receives data to/from an RFID reader (not shown) wirelessly. That is, the antenna part 110 receives an electromagnetic wave from the RFID reader. The antenna part 110 receives a driving power to drive the RFID tag 100 through the electromagnetic wave. The antenna part 110 provides the driving power to the RFID driving part 120.

The RFID driving part 120 is electrically connected to the antenna part 110 to receive the driving power. The RFID driving part 120 is connected to the antenna part 110 in parallel and provides authentication information for authenticating the RFID tag 100 to the antenna part 110 in response to the driving power. Subsequently, the antenna part 110 transmits the authentication information to the RFID reader, and then the RFID reader authenticates the RFID tag 100 using the authentication information. Although not shown in the figures, the RFID driving part 120 has at least one driving element to control data transmission/reception with the RFID reader.

The limiter 130 is located between the antenna part 110 and the RFID driving part 120 and is connected to the antenna part 110 in parallel. The limiter 130 controls the input current to the RFID driving part 120 according to the intensity of the input voltage VIN transmitted from the antenna part 110 to the RFID driving part 120.

Hereinafter, the configuration of the limiter 130 and the process of controlling the leakage current based on the input voltage according to certain exemplary embodiments of the present invention will be described in detail.

Figure 2:
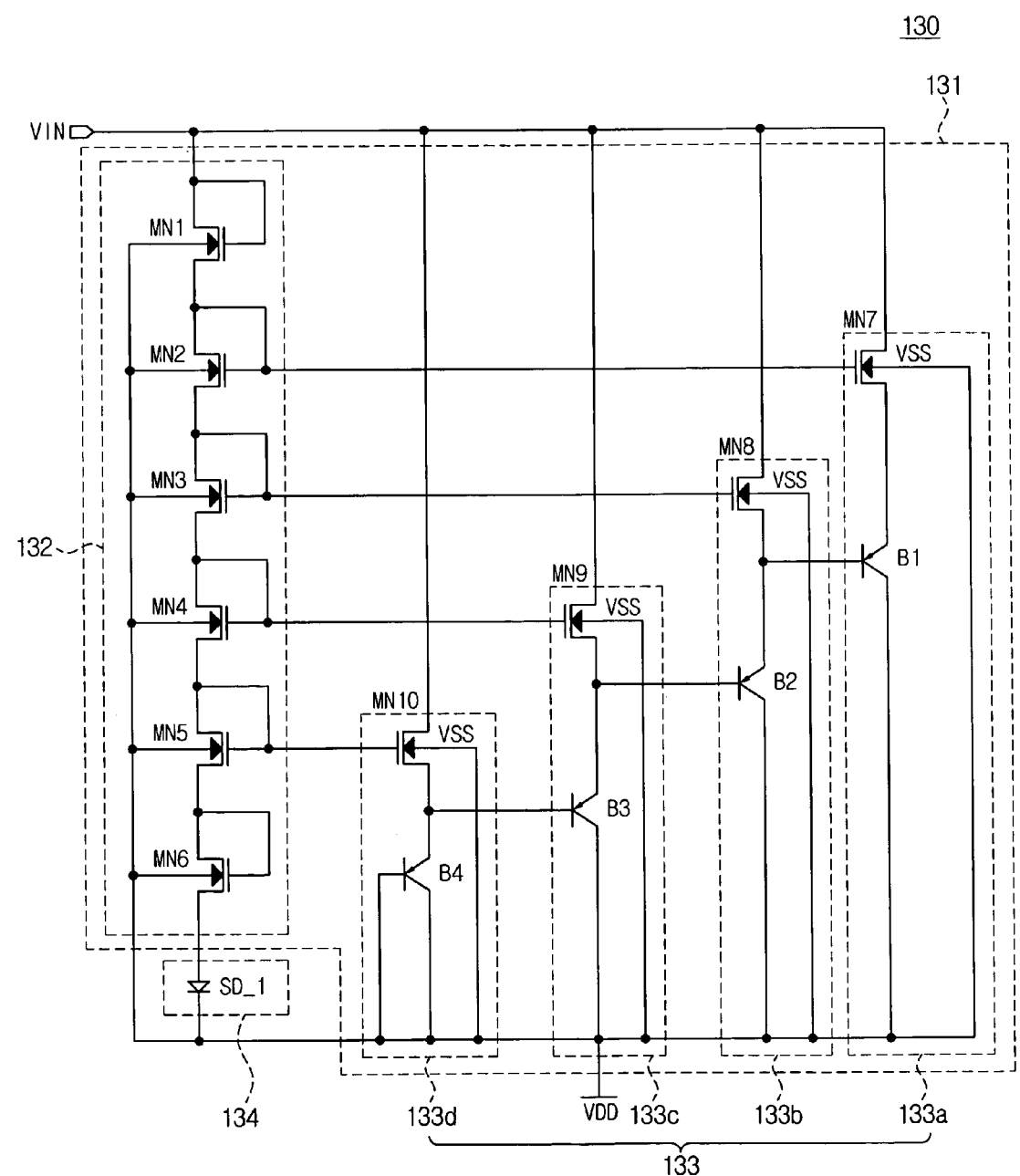
FIG. 2 is a circuit diagram showing the limiter in FIG. 1.

FIG. 2 is a circuit diagram showing the limiter in FIG. 1.

Referring to FIG. 2, the limiter 130 includes a first limiter part 131 and a second limiter part 134.

Specifically, the first limiter part 131 includes a first switching part 132 and at least one second switching part 133. The first switching part 132 includes plural first elements MN1, MN2, MN3, MN4, MN5 and MN6. In this exemplary embodiment, the first switching part 132 has six first elements MN1, MN2, MN3, MN4, MN5 and MN6, but the number of main elements depends on the identification distance of the RFID reader, threshold voltage of each first element, and reference voltage for controlling the leakage current, that is, proper driving voltage of the RFID driving part 120.

The plural first elements MN1, MN2, MN3, MN4, MN5 and MN6 are N channel MOSFETs. The MOSFET is a type of field effect transistor (FET) with a layer of oxide insulation, for example, a layer of silicon dioxide insulation. The gate of the MOSFET is insulated from the conductive channel in the semiconductor by a layer of oxide insulation and requires a gate input voltage as much as pulse to charge or remove the input charge. The MOSFET can operate by power lower than that of bipolar junction transistor (BJT).

The plural first elements MN1, MN2, MN3, MN4, MN5 and MN6 are sequentially connected to one another in series and are sequentially placed. The gate and drain of each first element MN1, MN2, MN3, MN4, MN5 and MN6 are connected to each other. Accordingly, the gates and drains receive the same voltage so that each first element MN1, MN2, MN3, MN4, MN5 and MN6 functions as a diode.

If the input voltage VIN is over the reference voltage, the plural first elements MN1, MN2, MN3, MN4, MN5 and MN6 are sequentially turned on. If the input voltage VIN is below the reference voltage, the plural first elements MN1, MN2, MN3, MN4, MN5 and MN6 are sequentially turned off.

The plural second switching parts 133 are connected to the first switching part 132 in parallel in the forward direction. In this exemplary embodiment, the plural second switching parts 133 have a first to fourth sub switching parts 133a, 133b, 133c and 133d, but the amount of the sub switching parts depends on the number of the first elements MN1, MN2, MN3, MN4, MN5 and MN6.

The plural second switching parts 133 have plural second elements MN7, MN8, MN9, MN10, B1, B2, B3 and B4, consisting of four MOSFETs MN7, MN8, MN9 and MN10, and four BJTs B1, B2, B3 and B4.

Each sub switching part 133a, 133b, 133c and 133d consists of one MOSFET MN7, MN8, MN9 and MN10 and one BJT element B1, B2, B3 and B4, which are connected to each other in series.

In detail, the MOSFET MN7 of the first sub switching part 133a is connected to the first element MN2 in parallel, the MOSFET MN8 of the second sub switching part 133b is connected to the first element MN3 in parallel, the MOSFET MN9 of the third sub switching part 133c is connected to the first element MN4 in parallel, and the MOSFET MN10 of the fourth sub switching part 133d is connected to the first element MN5 in parallel.

Therefore, the gates of the MOSFETs MN7, MN8, MN9 and MN10 of the plural sub switching parts 133a, 133b, 133c and 133d receive the gate voltage from the first elements MN1, MN2, MN3, MN4 and MN5 connected to the second switching parts 133. That is, the MOSFET MN7 of the first sub switching part 133a receives the gate voltage from the first element MN2, the MOSFET MN8 of the second sub switching part 133b receives the gate voltage from the first element MN3, the MOSFET MN9 of the third sub switching part 133c receives the gate voltage from the first element MN4, and the MOSFET MN10 of the fourth sub switching part 133d receives the gate voltage from the fifth element MN5.

Each emitter of the BJTs B1, B2, B3 and B4 receives the drain voltage from each MOSFET MN7, MN8, MN9 and MN10.

As the operation between the first switching part 132 and each sub switching parts 133a, 133b, 133c and 133d has the same process, the operation between the first switching part 132 and the first sub switching part 133a is exemplified.

If the first element MN2 is turned on, the MOSFET MN7 of the first sub switching part 133a is turned on, and then the BJT B1 of the first sub switching part 133a is turned on. The current of the BJTs B1, B2, B3 and B4 of the plural second switching parts 133 is an exponential function of the base-emitter voltage. Accordingly, using the feature of the exponential function, if the input voltage is below the reference voltage, the limiter 130 can decrease the leakage current, and if the input voltage is over the reference voltage, the limiter 130 can sharply increase the leakage current.

For example, it is assumed that the reference voltage is 5V and the threshold voltage of each first elements MN1, MN2, MN3, MN4, MN5 and MN6 is 0.8V. If the input voltage VIN is at least 0.8V but less than 1.6V, only the first element MN1 of the first switching part 132 is turned on. Even though MOSFETs MN7, MN8, MN9 and MN10 of the plural second switching parts 133 have the threshold voltage of 0.8V, the input voltage VIN is supplied to not the gate but the source so that MOSFETs MN7, MN8, MN9 and MN10 of the plural second switching parts 133 are not turned on. Conversely, if the input voltage VIN is at least 5V, the first elements MN1, MN2, MN3, MN4, MN5 and MN6, and the second elements MN7, MN8, MN9, MN10, B1, B2, B3 and B4 are all turned on. Accordingly, the input voltage VIN passes through the first switching part 132 and the plural second switching parts 133 so that the leakage current sharply increases. As a result, the input voltage to the RFID driving part 120 (shown in FIG. 1) sharply drops.

If the input voltage VIN over the reference voltage is input to the limiter 130, the first elements MN1, MN2, MN3, MN4, MN5 and MN6 sequentially drop the level of the input voltage. However, if the level of the input voltage dropped by the first switching part 132 is lower than the threshold voltage of the first elements MN1, MN2, MN3, MN4, MN5 and MN6, the input voltage can not drop any more. Therefore, even when the overvoltage is input, there is a threshold limit to the increase in the leakage current.

The second limiter part 134 drops the input voltage which is not capable of dropping due to the threshold voltage of the first elements MN1, MN2, MN3, MN4, MN5 and MN6 so that the leakage current on overvoltage can be maximized.

To be more specific, the second limiter part 134 is connected to the first switching part 132 in the forward direction. The second limiter part 134 is connected to the first element MN6 of the first switching part 132 in series, and is a limit diode SD1. The limit diode SD1 has the threshold voltage lower than the threshold voltage of the first elements MN1, MN2, MN3, MN4, MN5 and MN6, and is implemented with a Schottky barrier diode. The Schottky barrier diode is a diode using the rectifying action which occurs on the contacted surface between metal and semiconductor, and has the threshold voltage of about 0.2 V.

The limit diode SD1 receives and drops the input voltage dropped by the first switching part 132. In particular, as the limit diode SD1 has the threshold voltage lower than that of the first elements MN1, MN2, MN3, MN4, MN5 and MN6, if a voltage, which is greater than 0.2V but lower than the threshold voltage of the first elements MN1, MN2, MN3, MN4, MN5 and MN6, is induced, the limit diode SD1 becomes turned on.

Figure 3:
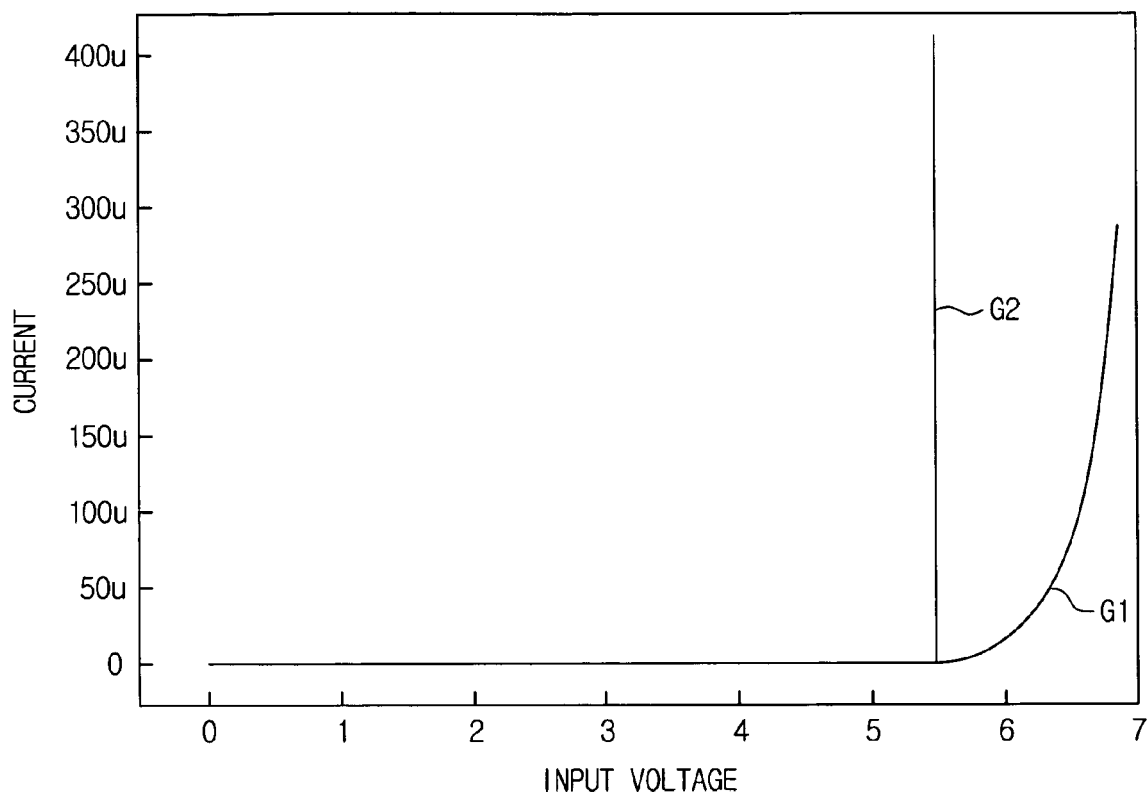
FIG. 3 is a graph showing the current-voltage relation of the limiter illustrated in FIG. 2.

FIG. 3 is a graph showing the current-voltage relation of the limiter illustrated in FIG. 2.

Referring to FIGS. 2 and 3, the first C-V line G1 shows the current-voltage relation of the first limiter part 131 and the second C-V line G2 shows the ideal current-voltage relation of the limiter 130.

In the first C-V line G1, if the input voltage VIN is lower than the reference voltage, the current is not generated. As the input voltage VIN increasingly gets greater than the reference voltage, the current is increased. Preferably, but not necessarily, as in the second C-V line G2, if the input voltage VIN is lower than the reference voltage, the current is not generated, and if the input voltage VIN is greater than the reference voltage, the current must sharply increase.

However, if the dropped input voltage is lower than the threshold voltage of the first elements MN1, MN2, MN3, MN4, MN5 and MN6, the first limiter part 131 can not drop the input voltage further, so that the slope of the first C-V line G1 is at a lower angle than that of the second C-V line G2.

As the threshold voltage of the limit diode SD1 of the second limiter part 134 is lower than that of the first elements MN1, MN2, MN3, MN4, MN5 and MN6, the input voltage can drop to the maximum upon overvoltage. Accordingly, the second limiter part 134 can again drop the level of the input voltage dropped by the first switching part 132. Therefore, if the input voltage VIN is greater than the reference voltage, the limiter 130 can maximize the leakage current. As a result, the current-voltage relation in the limiter 130 according to an exemplary embodiment of the present invention becomes close to the second C-V line G2.

Figure 4:
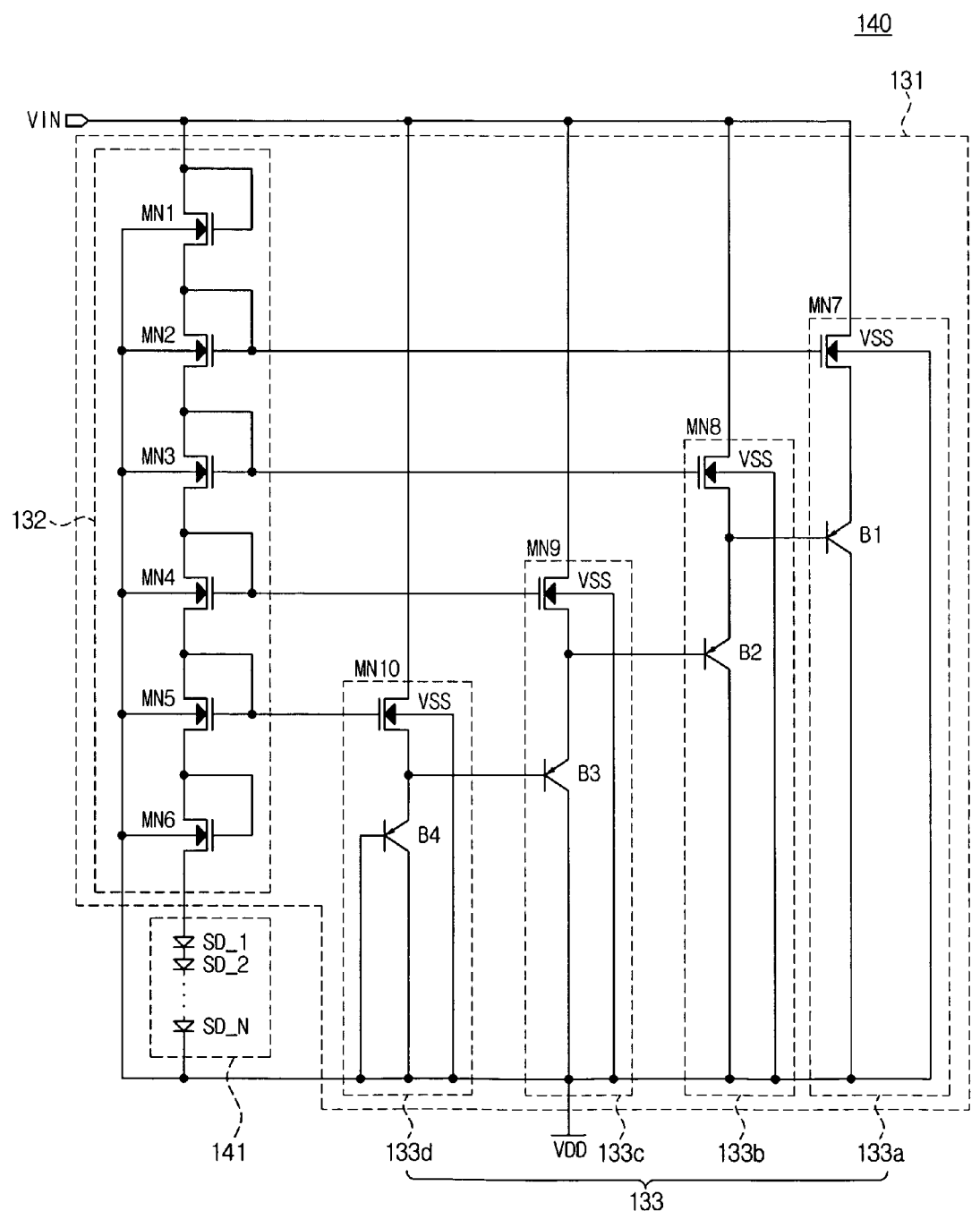
FIG. 4 is a circuit diagram showing a limiter according to another exemplary embodiment of the present invention.

FIG. 4 is a circuit diagram showing a limiter according to another exemplary embodiment of the present invention.

As FIG. 4 shows, the limiter 140 according to another exemplary embodiment of the present invention has the same structure as the limiter 130 in FIG. 2, except for a second limiter part 141. Accordingly, in referring to the elements having the same structure and operation as in the previous exemplary embodiment of the present invention, the elements will be cited by the same reference numerals throughout and the overlapping description will be omitted.

The limiter 140 includes a first limiter part 131 and a second limiter part 141. The second limiter part 141 is connected to a first switching part 132 of the first limiter part 131 in series in the forward direction. The second limiter part 141 includes plural limit diodes SD_1, SD_2, ..., and SD_N. The plural limit diodes SD_1, SD_2, ..., and SD_N are connected to one another in series, and have the threshold voltage lower than that of first elements MN1, MN2, MN3, MN4, MN5 and MN6. The plural limit diodes SD_1, SD_2, . . . , and SD_N are the Schottky barrier diodes.

The plural limit diodes SD_1, SD_2, . . . , and SD_N receive and drop the input voltage dropped by the first switching part 132. In particular, as the threshold voltage of the plural limit diodes SD_1, SD_2, . . . , and SD_N is lower than that of first elements MN1, MN2, MN3, MN4, MN5 and MN6, if a voltage, which is greater than 0.2V but lower than the threshold voltage of the first elements MN1, MN2, MN3, MN4, MN5 and MN6, is induced, the plural limit diodes SD_1, SD_2, . . . , and SD_N become turned on. Accordingly, the second limiter part 141 can again drop the level of the input voltage dropped by the first switching part 132. The greater the amount of the limit diodes SD_1, SD_2, . . . , and SD_N, the more the input voltage drops.

As described above, the limiter 140 includes the first and second limiter part 131 and 141. So, if the overvoltage is supplied, the limiter 140 can maximize the leakage current, and if a voltage lower than the reference voltage is supplied, the limiter 140 can minimize the leakage current. Accordingly, the RFID tag 100 (shown in FIG. 1) can normally operate regardless of the intensity of the driving voltage input from the RFID reader. As a result, the yields of products can improve.

As described above, the limiter of the RFID tag includes the first limiter part and the second limiter part including at least one limit diode with the threshold voltage lower than that of the elements in the first limiter part. Accordingly, if the overvoltage is supplied, the limiter can maximize the leakage current, and if a voltage lower than the reference voltage is supplied, the limiter can minimize the leakage current. As a result, the RFID tag can prevent the RFID driving part from being damaged due to the overvoltage. In addition, the RFID tag can normally operate regardless of the intensity of the driving voltage input from the RFID reader, so that the yields of products can improve.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A limiter for controlling an overvoltage, comprising:
   a first limiter part comprising a first switching part and at least one second switching part which is connected to the first switching part in parallel, the first switching part comprising a plurality of first elements which are connected in series and sequentially turned on according to an intensity of an input voltage; and
   a second limiter part which is connected to the first switching part, the second limiter part comprising at least one limit diode with a threshold voltage which is lower than a threshold voltage of the first elements.

2. The limiter of claim 1, wherein the limit diode is a Schottky barrier diode.

3. The limiter of claim 1, wherein the limit diode is serially connected to the first switching part in a forward direction.

4. The limiter of claim 1, wherein the second limiter part comprises a plurality of limit diodes, which are connected in series.

5. The limiter of claim 1, wherein the first elements are metal oxide semiconductor field effect transistors (MOSFET).

6. The limiter of claim 1, wherein the second switching part comprises a pair of second elements which have different current features and are connected in series.

7. The limiter of claim 6, wherein the pair of second elements comprises a metal oxide semiconductor field effect transistor and a bipolar junction transistor.

8. A radio frequency identification (RFID) tag, comprising:
   an antenna part which receives and outputs an input voltage;
   an RFID driving part which is connected to the antenna part in parallel in the forward direction, receives the input voltage, generates an authentication information in response to the input voltage, and provides the authentication information to the antenna part; and
   a limiter which is connected to the antenna part in parallel in the forward direction, and is turned on according to an intensity of the input voltage,
   wherein the limiter comprises a first limiter part comprising a first switching part and a second limiter part which is connected to the first switching part and includes at least one limit diode with a threshold voltage lower than that of the first elements, and
   wherein the first switching part comprises a plurality of first elements which are connected in series and sequentially turned on according to the intensity of the input voltage, and at least one second switching part is connected to the first switching part in parallel.

9. The RFID tag of claim 8, wherein a driving voltage of the limiter is greater than a driving voltage of the RFID driving part, and if the input voltage from the antenna part is greater than the driving voltage of the RFID driving part, the limiter becomes turned on.

10. The RFID tag of claim 8, wherein the limit diode is a Schottky barrier diode.

11. The RFID tag of claim 8, wherein the limit diode is serially connected to the first switching part in a forward direction.

12. The RFID tag of claim 8, wherein the second limiter part includes a plurality of limit diodes which are connected to one another in series.

13. The RFID tag of claim 8, wherein the plurality of first elements are metal oxide semiconductor field effect transistors.

14. The RFID tag of claim 8, wherein the second switching part comprises a pair of second elements which have different current features and are connected to each other in series.

15. The RFID tag of claim 14, wherein the pair of second elements comprises a metal oxide semiconductor field effect transistor and a bipolar junction transistor.

* * * * *